United States Patent [19]
Kamei et al.

[11] Patent Number: 5,542,707
[45] Date of Patent: Aug. 6, 1996

[54] SUBFRAME ASSEMBLY FOR VEHICLE

[75] Inventors: Takahiro Kamei; Shinji Hinosawa; Tokuji Takahashi; Yoshiji Terada; Takeaki Nakajima; Yoshiyasu Sakata, all of Saitama, Japan

[73] Assignee: Honda Giken Kogyo Kabushiki Kaisha, Tokyo, Japan

[21] Appl. No.: 506,319

[22] Filed: Jul. 24, 1995

[30] Foreign Application Priority Data

Jul. 25, 1994 [JP] Japan ................................. 6-172242
Aug. 4, 1994 [JP] Japan ................................. 6-183747

[51] Int. Cl.⁶ ............................................. B60P 3/22
[52] U.S. Cl. ................................. 280/834; 280/781
[58] Field of Search .......................... 280/781, 833, 280/834

[56] References Cited

U.S. PATENT DOCUMENTS

| | | | |
|---|---|---|---|
| 2,276,963 | 3/1942 | Griffin | 280/833 |
| 3,311,183 | 3/1967 | Phillips | 280/833 |
| 3,884,255 | 5/1975 | Merkle | 280/834 |
| 4,545,589 | 10/1985 | Watanabe et al. | 280/834 |
| 5,364,128 | 11/1994 | Ide | 280/834 |
| 5,405,167 | 4/1995 | Lee | 280/834 |

FOREIGN PATENT DOCUMENTS 58643 1/1993 Japan .

Primary Examiner—Kenneth R. Rice
Attorney, Agent, or Firm—Weiner, Carrier & Burt, P.C.; Joseph P. Carrier; Irving M. Weiner

[57] ABSTRACT

In a subframe assembly for a vehicle, a front portion of a fuel tank supported on a subframe overhangs forwardly from a front cross-member of the subframe to increase the volume of the fuel tank. In order to compensate the forward displacement of the position of the gravity center due to the overhanging of the fuel tank, an exhaust silencer is supported to overhang rearwardly from a rear cross-member of the subframe, and a rear differential supported by the subframe below a lower surface of the fuel tank is disposed in proximity to the rear cross-member inside the subframe. Thus, the position of the gravity center of the subframe assembly is maintained at a substantially central portion of the subframe.

17 Claims, 8 Drawing Sheets

SUBFRAME ASSEMBLY FOR VEHICLE

BACKGROUND OF THE INVENTION

1. Field of the Invention

The present invention relates to a subframe assembly for a vehicle, including a subframe mounted at a rear portion of a vehicle body frame through a plurality of support portions, and at least a fuel tank and a rear suspension which are supported on the subframe.

2. Description of Relevant Art

There is a known subframe assembly for a vehicle, which is described in Japanese Patent Application Laid-open No. 8643/93. By mounting the subframe assembly previously subassembled on the vehicle body frame such as described in the Laid-open Application, the assembling of parts on the subframe can be facilitated to enhance the working efficiency.

Engines of different displacements may be often mounted in the same vehicle body frame, and in such a case, it is difficult to increase the volume of the fuel tank without changing the vehicle body frame. In addition, the known subframe assembly has a problem that since the rear differential is disposed below the fuel tank, it is necessary to form a recess for accommodating the rear differential in a lower surface of the fuel tank and as a result, it is difficult to sufficiently insure the volume of the fuel tank.

To overcome such disadvantages, it is conceived that the front portion of the fuel tank be extended to overhang forwardly from a front end of the subframe to increase the volume of the fuel tank. However, this causes the position of the gravity center of the subframe assembly to be displaced forwardly, resulting not only in a problem that when the subframe assembly is placed onto a pallet to flow on a conveyor in an assembling line, the stability of the subframe assembly is deteriorated, but also in a problem that when the subframe assembly is mounted on the vehicle body frame through a plurality of rubber bush mounts, the load applied to the rubber bush mounts is not uniform which adversely affects the vibration-proofing property of the mounts.

SUMMARY OF THE INVENTION

Accordingly, it is an object of the present invention to establish the position of the gravity center of the subframe assembly at a substantially central portion of the subframe, while sufficiently insuring the volume of the fuel tank.

To achieve the above object, according to the present invention, there is provided a framework-like subframe assembly for a vehicle, comprising a subframe mountable at a rear portion of a vehicle body frame through a plurality of support portions, a fuel tank, left and right rear suspensions disposed on left and right opposite sides of the fuel tank, and an exhaust unit including a silencer, the fuel tank, the left and right rear suspensions and the exhaust unit being supported on the subframe, wherein a front portion of the fuel tank is supported to overhang forwardly from a front end of the subframe, and the silencer is disposed and supported to overhang rearwardly from a rear end of the subframe.

With the above construction, even if the front portion of the fuel tank overhangs forwardly from the front end of the subframe to increase the volume of the fuel tank, the forward displacement of the position of gravity center due to the overhanging of the fuel tank can be compensated by the rearward overhanging of the silencer from the rear end of the subframe, and the position of the gravity center of the subframe assembly as a whole can be maintained at a substantially central portion of the subframe. Thus, it is possible to enhance the stability of the subframe assembly placed on a pallet, and when the subframe assembly is supported on the vehicle body frame, the load applied to the plurality of support portions can be made uniform.

If a rear differential accommodated in a recess defined in a lower surface of the fuel tank is supported at a location displaced rearwardly from a longitudinally central portion of the subframe, it is possible to further easily adjust the position of the gravity center of the subframe assembly.

In addition, according to the present invention, there is provided a subframe assembly for a vehicle, comprising a framework-like subframe mountable at a rear portion of a vehicle body frame through a plurality of support portions, a fuel tank, left and right rear suspensions disposed on left and right opposite sides of the fuel tank, and a rear differential disposed so that it is fitted into a recess defined in a lower surface of the fuel tank, the fuel tank, the left and right rear suspensions and the rear differential being supported on the subframe, wherein a front portion of the fuel tank is supported to overhang forwardly from a front end of the subframe, and the rear differential is supported at a location displaced rearwardly from a longitudinally central portion of the subframe.

With the above construction, even if the front portion of the fuel tank overhangs forwardly from the front end of the subframe to increase the volume of the fuel tank, the forward displacement of the position of the subframe assembly's gravity center due to the overhanging of the fuel tank can be compensated or offset by the disposition of the rear differential at the location displaced rearwardly from the longitudinally central portion of the subframe, and the position of the gravity center of the subframe assembly as a whole can be maintained at the substantially central portion of the subframe. Thus, it is possible to enhance the stability of the subframe assembly as placed on a pallet, and when the subframe assembly is supported on the vehicle body frame, the load applied to the plurality of support portions can be made uniform.

Further, the fuel tank may have a band hole provided to pass therethrough in a thickness direction thereof, and a band groove extending along a surface thereof, and the fuel tank may be supported on the subframe by fixing, to the subframe, a tank-fixing band passed through the band hole and fitted in the band groove. Thus, it is possible not only to adjust or establish the shape of the fuel tank to any shape irrespective of the shape of the subframe to provide an increase in volume of the fuel tank, but also to set a mounting point for the fuel tank-fixing band to the subframe as desired. Moreover, it is possible to reliably prevent the misalignment of the fuel tank. Additionally, the length of the fuel tank-fixing band can be minimized, thereby reducing the weight and facilitating the mounting operation.

The above and other objects, features and advantages of the invention will become apparent from the following description of a preferred embodiment taken in conjunction with the accompanying drawings.

DESCRIPTION OF THE PREFERRED EMBODIMENTS

Figure 1:
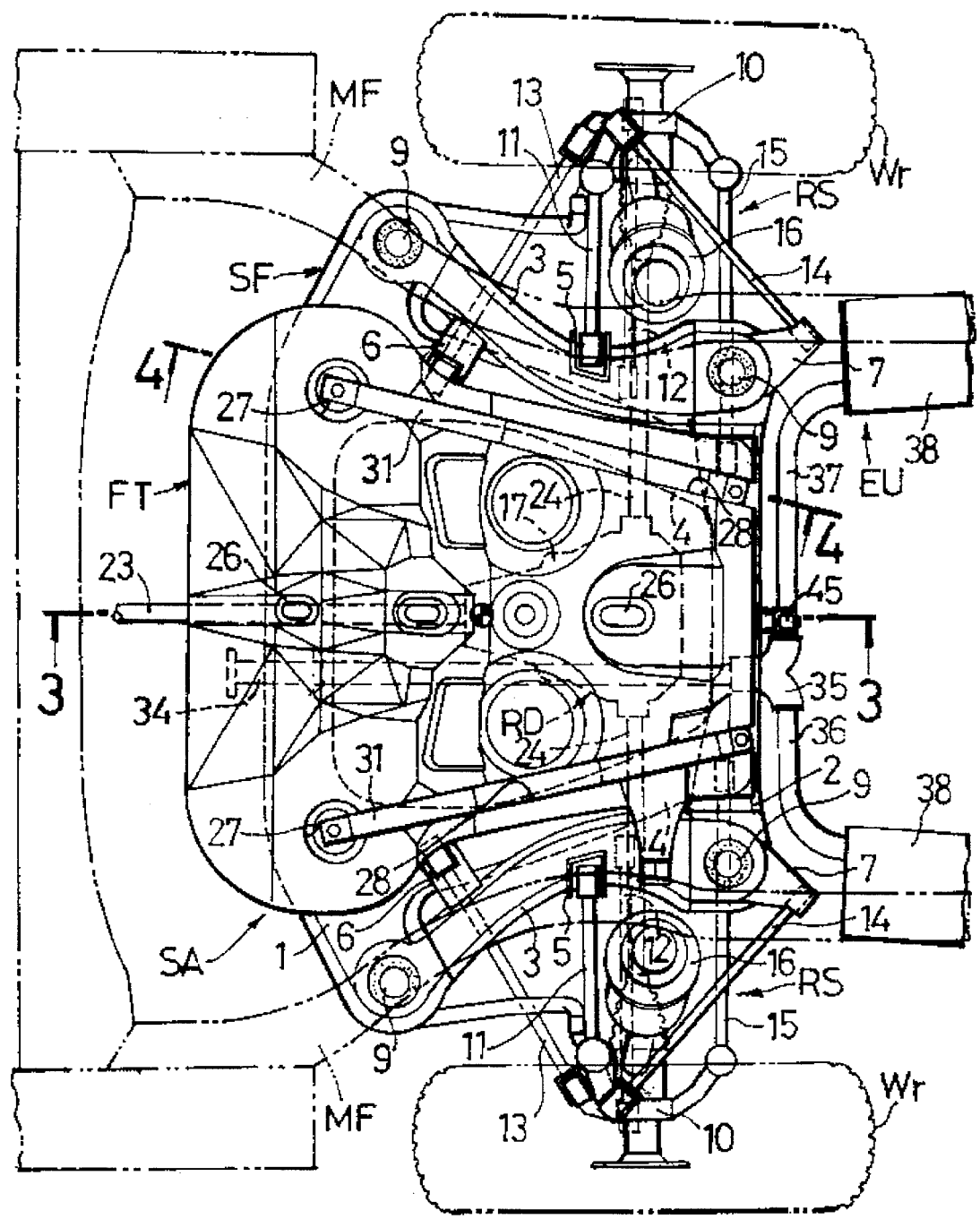
FIG. 1 is a plan view of a subframe assembly according to an embodiment of the present invention.
Figure 2:
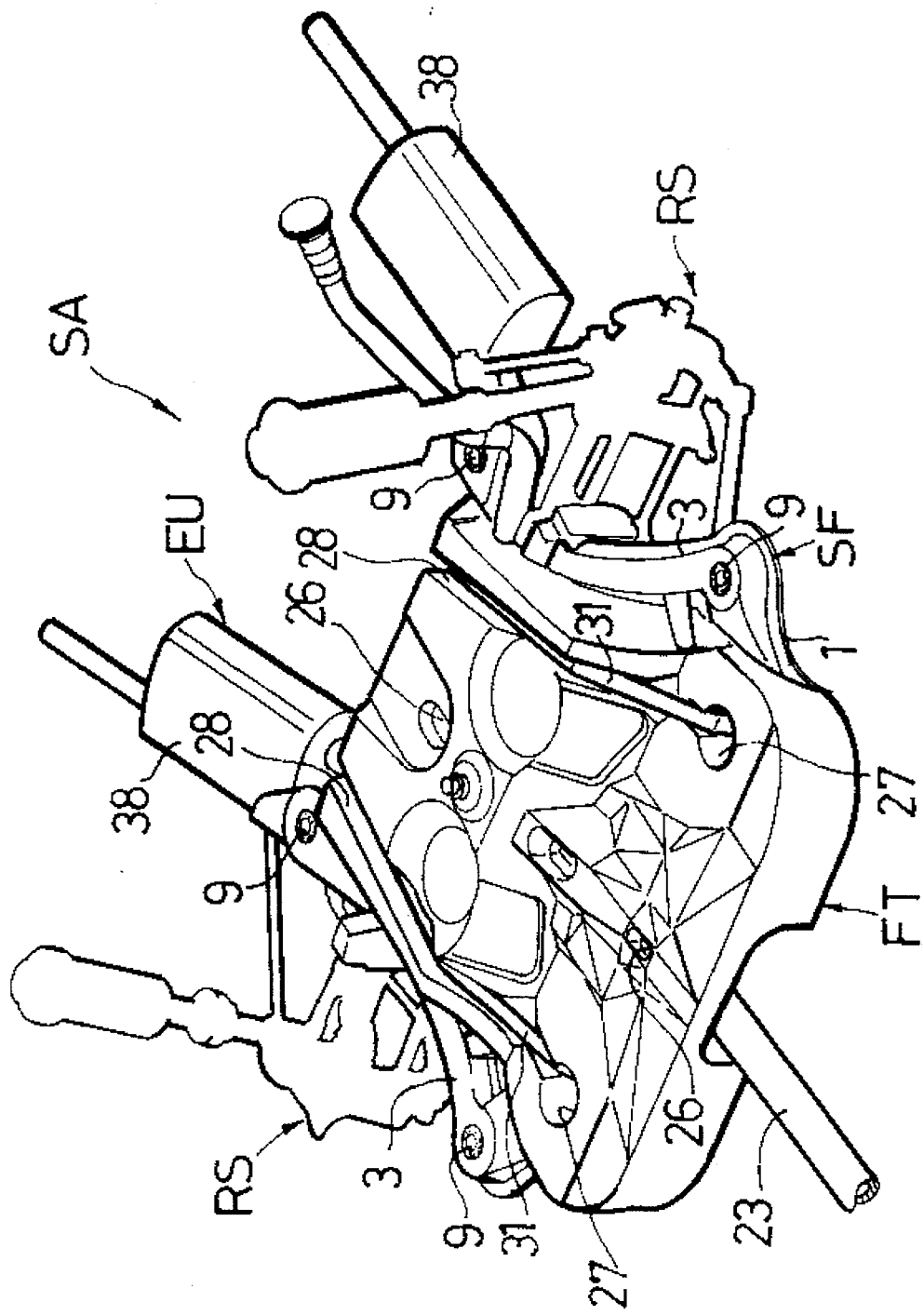
FIG. 2 is a perspective view of a top surface of the subframe assembly.

Referring to FIGS. 1 and 2, a subframe assembly SA is supported on a pair of left and right vehicle body frames MF, MF extending in a longitudinal direction at a rear portion of a vehicle body. The subframe assembly SA is formed by integrally assembling a framework-like subframe SF of a substantially rectangular shape as viewed in a plan, a pair of left and right rear suspensions RS, RS for supporting left and right rear wheels Wr, Wr, a rear differential RD, and an exhaust unit EU. The subframe assembly SA is previously subassembled in an assembling line separate from a vehicle body assembling line and is then mounted on the vehicle body frames MF, MF of a vehicle body flowing on the vehicle body assembling line.

Figure 6:
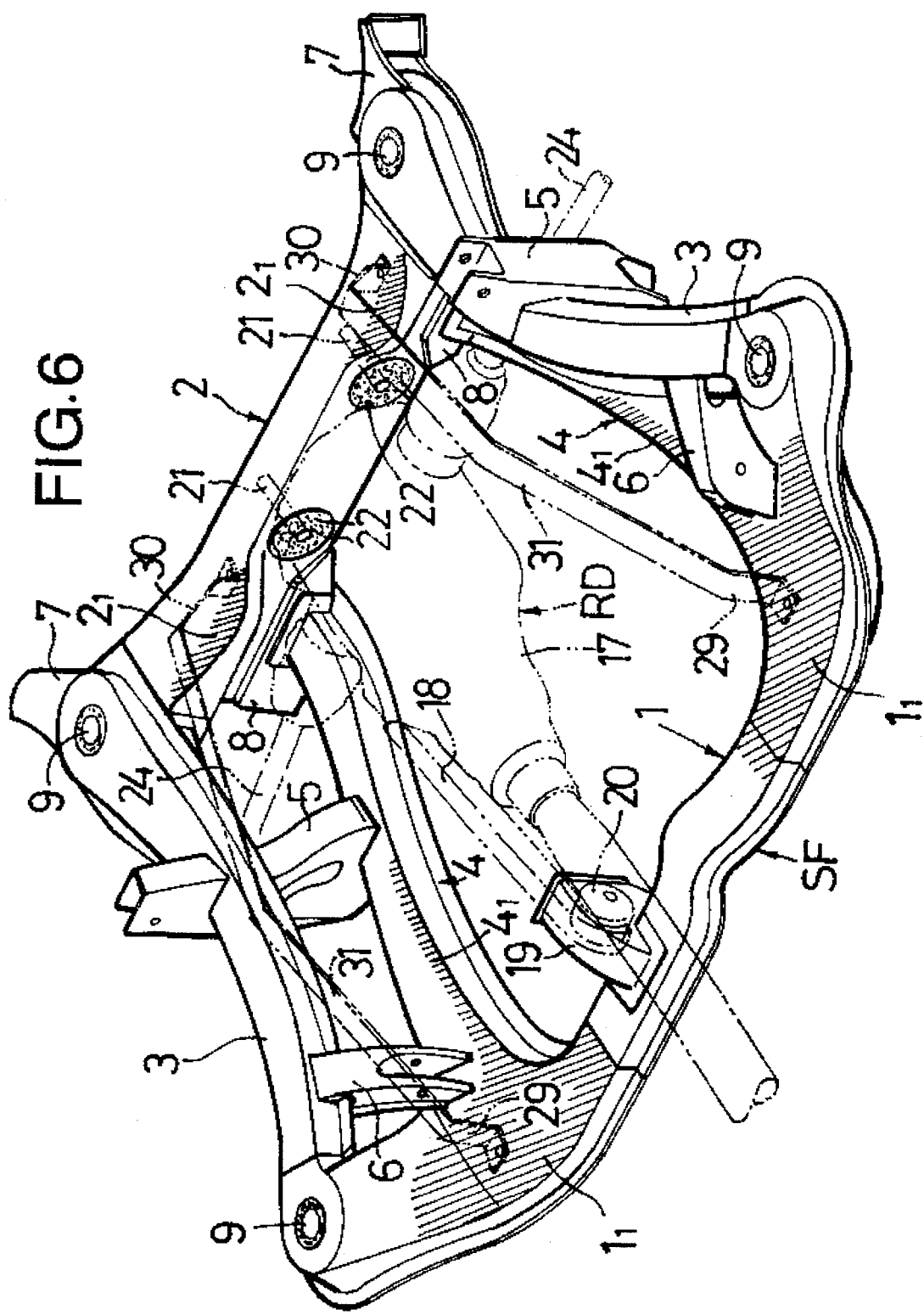
FIG. 6 is a perspective view of a bottom surface of the subframe assembly.

As shown in FIG. 6, the subframe SF includes a front cross-member 1 extending in a lateral direction of the vehicle body, a rear cross-member 2 extending in the lateral direction of the vehicle body in rear of the front cross member 1, a pair of left and right outer side-members 3, 3 extending in the longitudinal direction of the vehicle body to interconnect the left and right opposite ends of both the cross-members 1 and 2, and a pair of left and right inner side-members 4, 4 extending in the longitudinal direction of the vehicle body to interconnect both the cross-members 1 and 2 inside the outer side-members 3, 3. The rear cross-member 2 serves to support most of the weight of the rear differential RD, and has a large cross section so as to have a satisfactory rigidity.

The outer side-members 3, 3 are located at a level higher than that of the inner side-members 4, 4, and the inner side-members 4, 4 are interconnected by first brackets 5, 5 at lengthwise intermediate portions. The front cross-member 1 is connected with the left and right outer side-members 3, 3 by a pair of second brackets 6, 6, respectively. A pair of third brackets 7, 7 are mounted at rear ends of the left and right outer side-members 3, 3, and a pair of fourth brackets 8, 8 are mounted on a lower surface of the rear cross-member 2.

Four rubber bush mounts 9 for resiliently supporting the subframe SF on the vehicle body frames MF, MF are provided at four corners of the subframe SF, i.e., at joints between the front and rear cross-members 1 and 2 and the left and right outer side-members 3, 3.

As can be seen from FIG. 1, each of the rear suspensions RS is of a multi-link type, and comprised of a knuckle 10 for rotatably supporting the rear wheel Wr, an upper arm 11 for connecting the knuckle 10 to an upper end of the first bracket 5, a lower arm 12 for connecting the knuckle 10 to a lower end of the first bracket 5, a trailing arm 13 for connecting the knuckle 10 to the second bracket 6, a leading arm 14 for connecting the knuckle 10 to the third bracket 7, a control arm 15 for connecting the knuckle 10 to the fourth bracket 8, and a damper 16 for connecting the knuckle 10 to the vehicle body.

Figure 3:
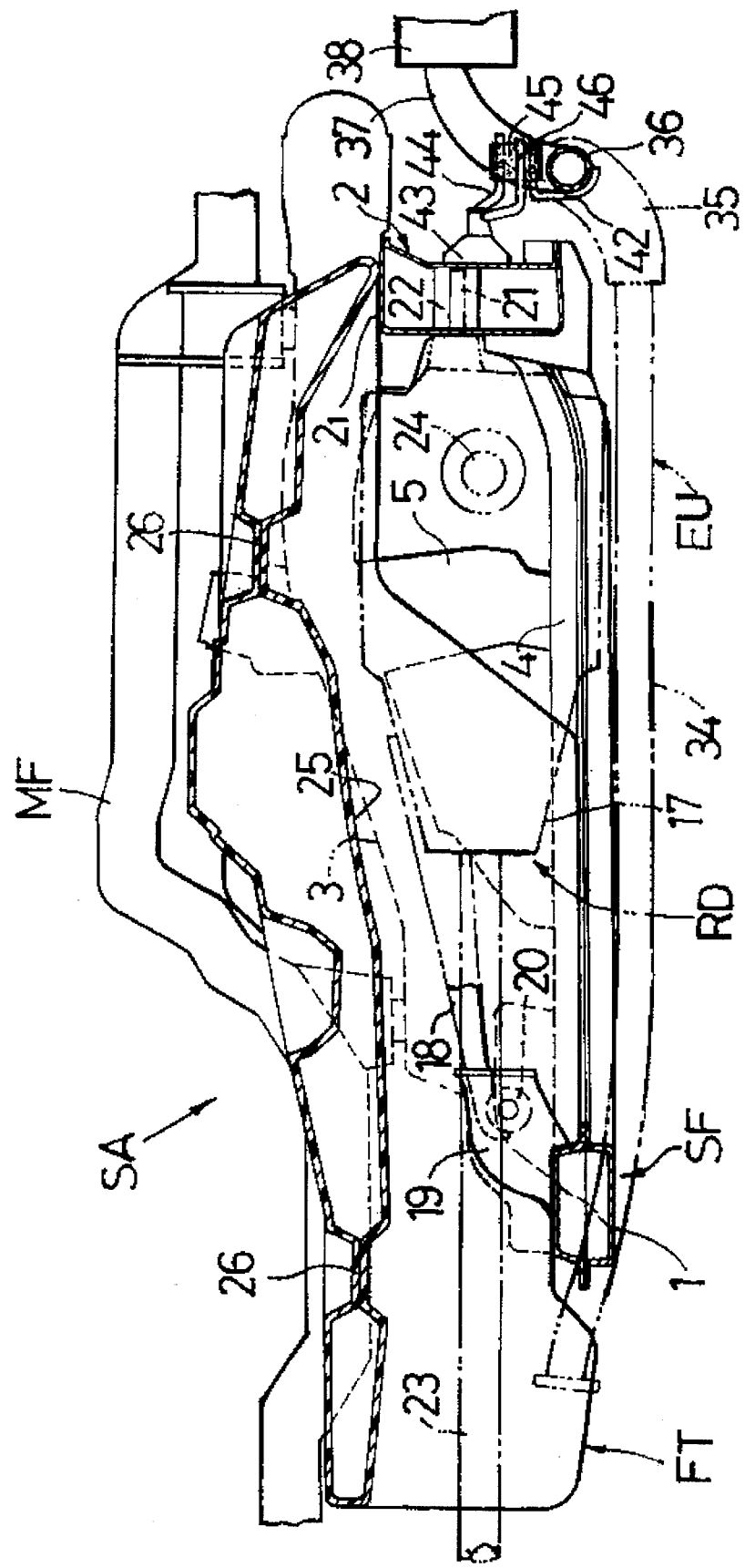
FIG. 3 is an enlarged sectional view taken along a line 3—3 in FIG. 1.

As can be seen from FIGS. 3 and 6, the rear differential RD includes a support arm 18 extending forwardly from a differential case 17. The support arm 18 is resiliently supported at its front end on a rubber bush 20 which is mounted on a bracket 19 projectingly mounted on an upper surface of the front cross-member 1 of the subframe SF. On the other hand, a pair of left and right pins 21, 21 extending rearwardly from the differential case 17 are fitted into and resiliently supported in a pair of rubber bushes mounted on the rear cross-member 2 of the subframe SF.

A propeller shaft 23 extends forwardly from the differential case 17 to pass above the front cross-member 1. Axles 24, 24 extend leftwardly and rightwardly from the differential case 17 to pass through the knuckles 10, 10, respectively and are connected to the rear wheels Wr, Wr.

As can be seen from FIGS. 1 to 4, a fuel tank FT is formed by a blow-molding from a synthetic resin, and has a tunnel provided in a recessed manner in a lower surface thereof to longitudinally extend, in order to accommodate the rear differential RD. The rear differential RD is disposed at a rear portion of the tunnel 25, i.e., at a location closer to the rear cross-member 2 inside the subframe SF. The thickness of the fuel tank FT is smaller in an area above the tunnel 25, and two welds 26, 26 (see FIG. 3), by which upper and lower walls of the fuel tank FT are bonded, are formed at such area.

Figure 4:
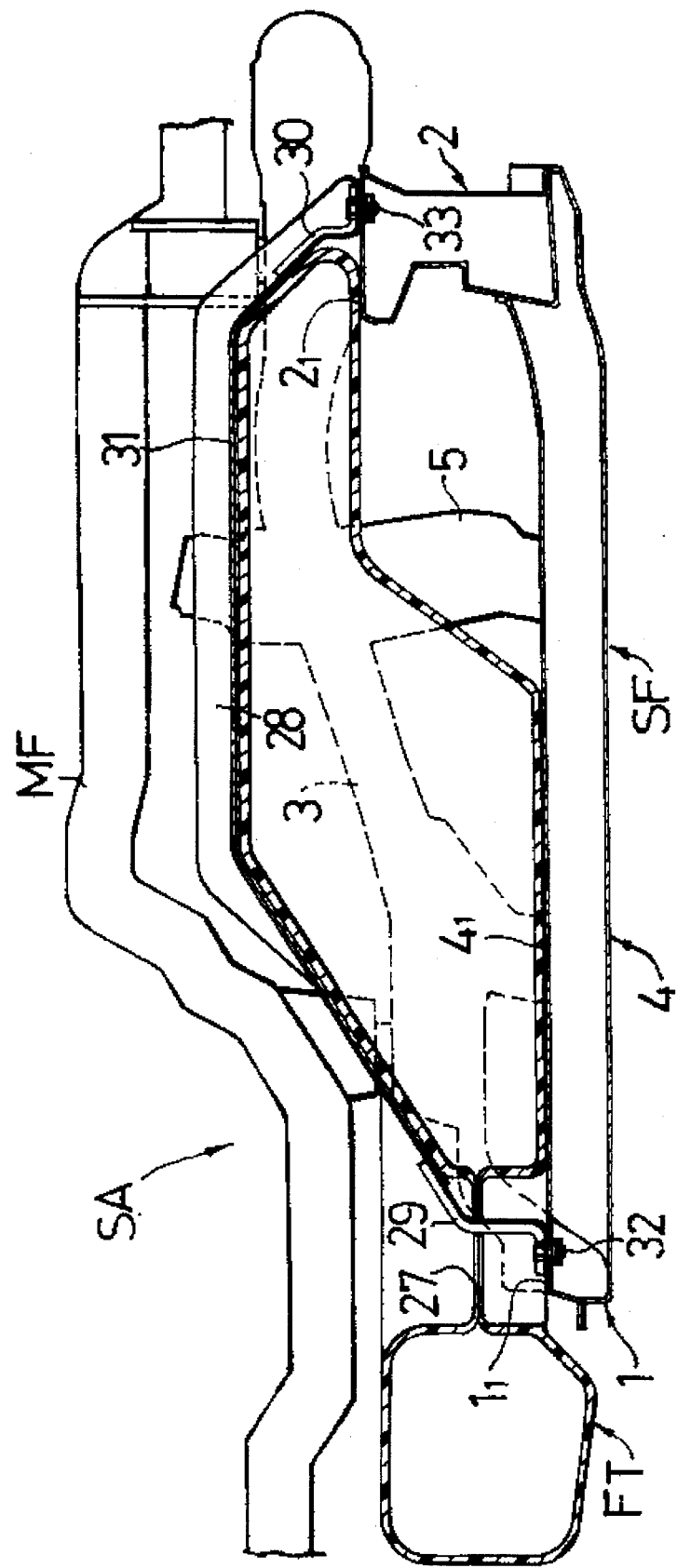
FIG. 4 is an enlarged sectional view taken along a line 4—4 in FIG. 1.

The fuel tank FT has a front portion which overhangs more forwardly than the front cross-member 1 (see FIGS. 3 and 4). Thus, a portion of the volume of the fuel tank FT reduced by the tunnel 25 is compensated and hence, the volume of the fuel tank FT as a whole can be sufficiently insured.

A pair of band holes 27, 27 are defined in left and right front portions of the fuel tank FT to vertically pass therethrough, and two band grooves 28, 28 extend rearwardly from the band holes 27, 27 to a rear end of the fuel tank FT. The band holes 27, 27 can be made by forming the welds in the formation of the fuel tank FT by the blow-molding, and then cutting out the welds. The rear portion of the fuel tank FT is placed on a pair of left and right tank abutments $2_1$, $2_1$ (see obliquely lined portions in FIG. 6) formed on left and right upper surface portions of the rear cross-member 2, and the front portion of the fuel tank FT is placed on a pair of left and right tank abutments $1_1$, $4_1$; $1_1$, $4_1$ (see obliquely lined portions in FIG. 6) formed on upper surfaces of the front cross-member 1 and the left and right inner side-members 4, 4.

Figure 5:
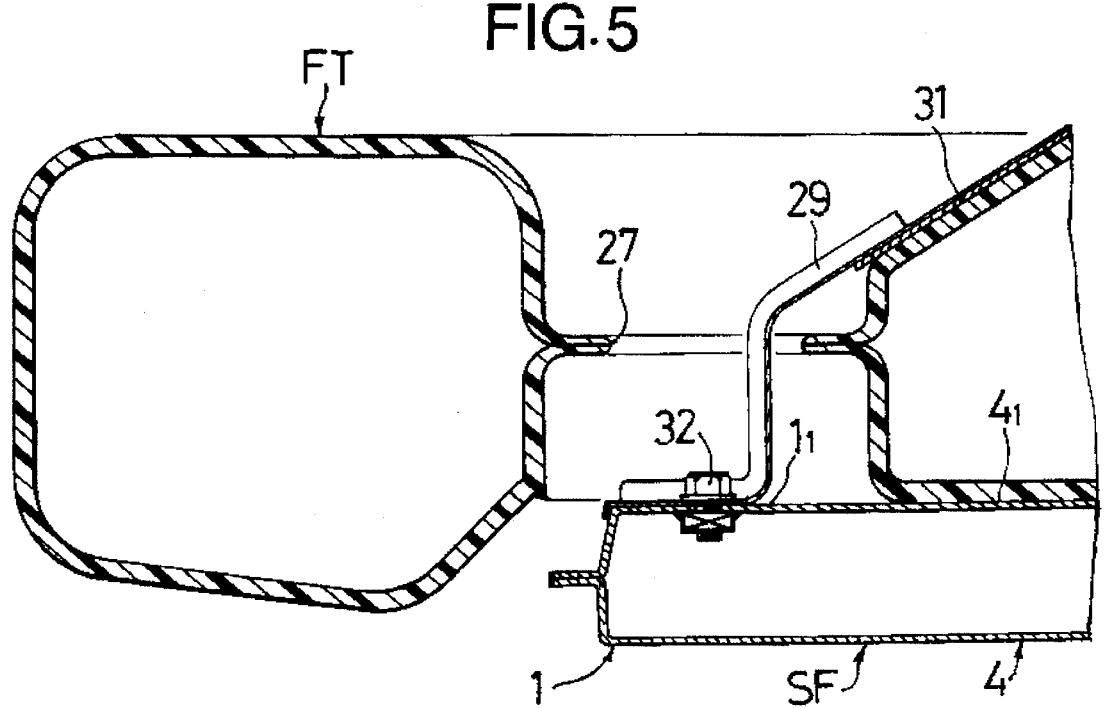
FIG. 5 is an enlarged view of an essential portion shown in FIG. 4.

As can be seen from FIGS. 2, 4 and 5, two fuel tank fixing bands 31, 31 are fitted in the band grooves 28, 28 and each have a front mounting portion 29 and a rear mounting portion 30 at front and rear opposite ends thereof. The fixing bands 31, 31 are fixed at their front mounting portions 30, 30 on the upper surface of the front cross-member 1 by bolts 32, 32 and at their rear mounting portions 31, 31 on the upper surface of the rear cross-member 2 by bolts 33, 33 to pass through the band holes 27, 27.

In this way, the pair of fuel tank abutments $2_1$, $2_1$ for supporting the lower surface of the rear portion of the fuel tank FT are located on the firm rear cross-member 2, which also supports most of the weight of the rear differential RD, and the two fuel tank fixing bands 31, 31 for fixing the fuel tank FT are fixed to the rear cross-member 2 in the vicinity of the fuel tank abutments $2_1$, $2_1$. Therefore, it is not only possible to firmly retain the fuel tank FT, but also a special member for supporting the fuel tank FT is not required, which is convenient in aspects of both cost and weight.

In addition, since the fuel tank fixing bands 31, 31 are fixed to the subframe SF in a condition in which the band holes 27, 27 are defined through the fuel tank FT, it is possible to establish any shape of the fuel tank FT irrespective of the shape of subframe SF. Thus, it is possible not only to provide an increase in volume of the fuel tank FT, but also to place the mounting points of the fuel tank fixing bands 31, 31 to the subframe SF at any desired points. Additionally, the length of the fuel tank fixing bands 31, 31 can be reduced depending upon the position of the band holes 27, 27 and hence, it is possible to reduce the weight and to facilitate the mounting operation. Moreover, since the fuel tank fixing bands 31, 31 are positioned by the band holes 27, 27 and the band grooves 28, 28, it is possible to reliably prevent the misalignment of the fuel tank FT.

As can be seen from FIG. 1, the exhaust unit EU is comprised of a front exhaust pipe 34 extending in the longitudinal direction of the vehicle body, a left rear exhaust pipe 36 and a right rear exhaust pipe 37 which are connected to a rear end of the front exhaust pipe 34 through a coupling 35 and which diverge laterally from each other, and a pair of left and right silencers 38, 38 connected to rear ends of the rear exhaust pipes 36 and 37, respectively.

Figure 7:
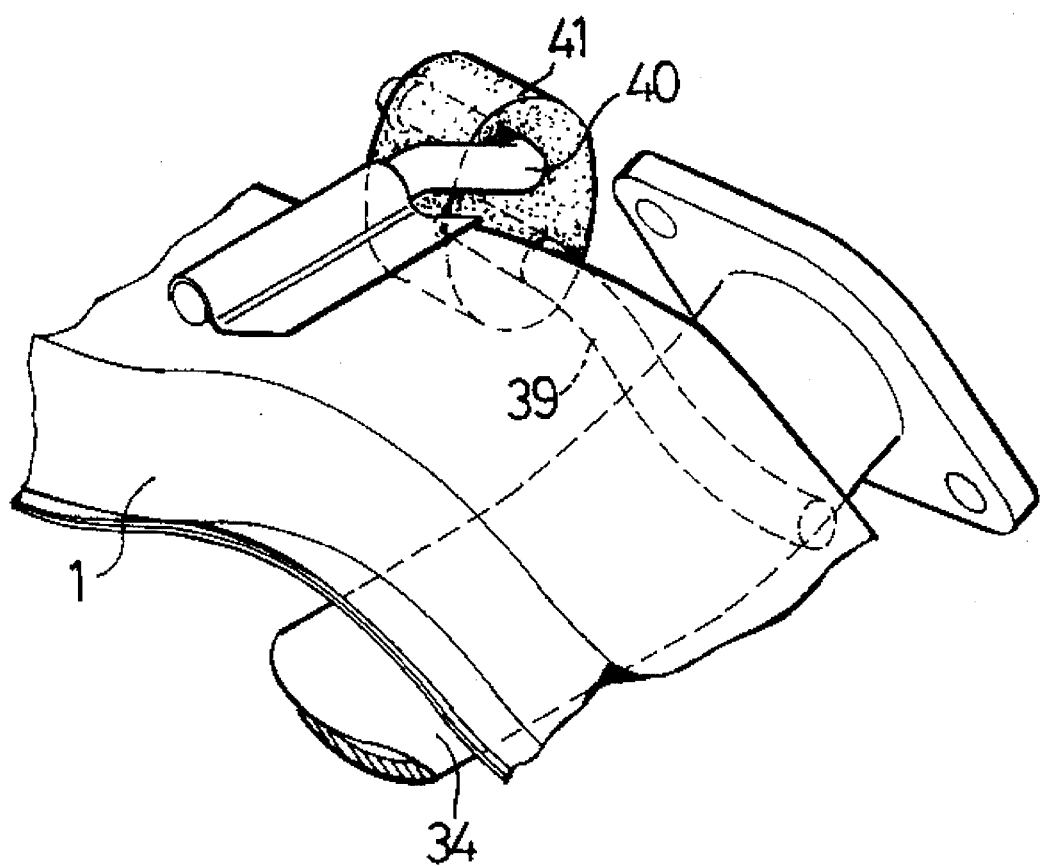
FIG. 7 is a perspective view of a support portion in front of an exhaust unit.

The front exhaust pipe 34 is accommodated within the tunnel 25 in the fuel tank FT and disposed on the left side of the propeller shaft 23 along a center line of the vehicle body. As can be seen from FIG. 7, a hanger pin 39 welded in the vicinity of a front end of the front exhaust pipe 34 is supported in a hung manner on a hanger pin 40 welded on the upper surface of the front cross-member 1, with a rubber joint 41 interposed between the hanger pins 39 and 40.

Figure 8:
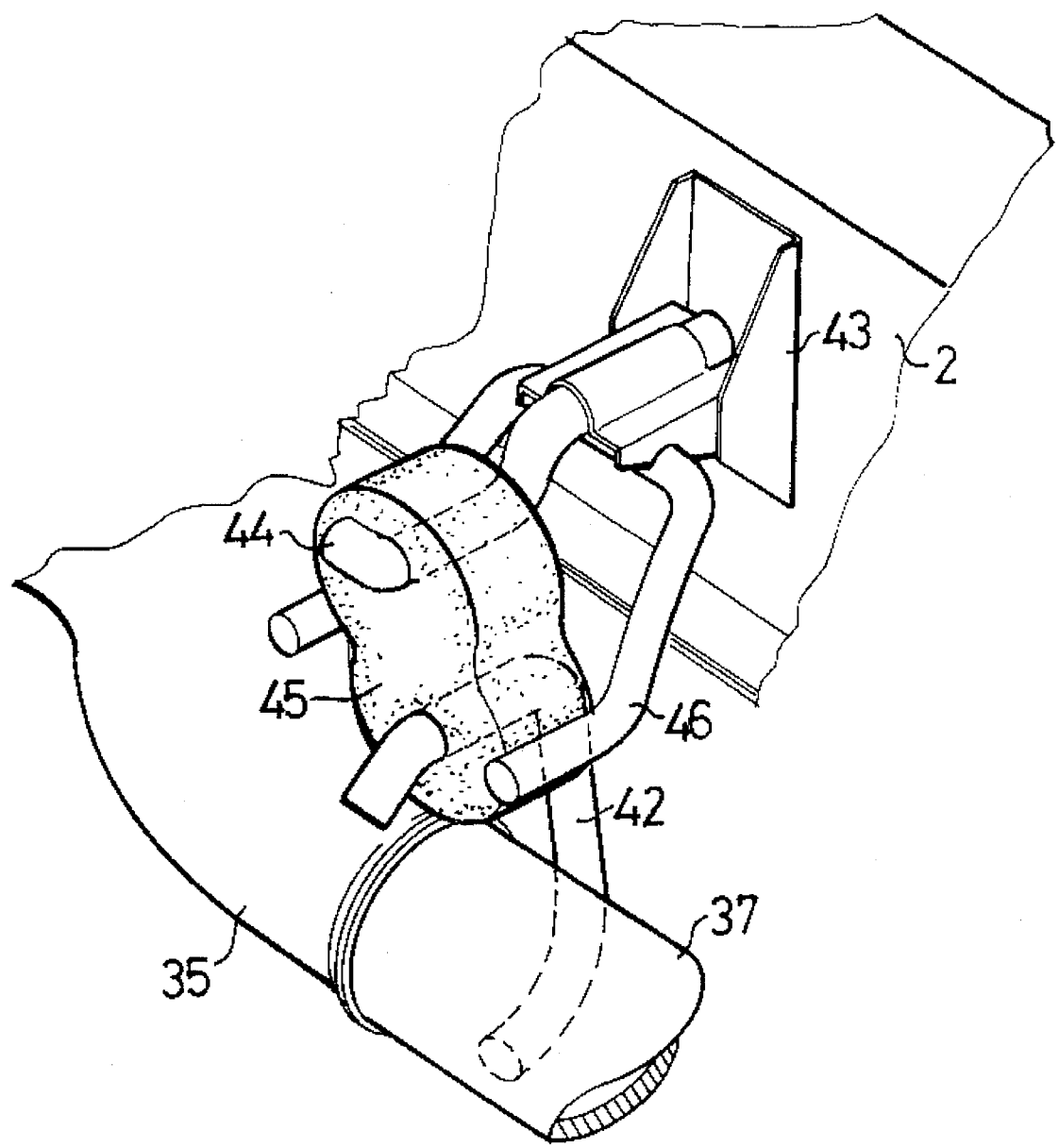
FIG. 8 is a perspective view of a support position behind the exhaust unit.

With reference to FIG. 8, a hanger pin 42 welded to a portion of the right rear exhaust pipe 37 near the coupling 35 is supported in a hung manner on a hanger pin 44 welded to a bracket 43 mounted on a rear surface of the rear cross-member 2, with a rubber joint 45 interposed between the hanger pins 42 and 44. Bracing pins 46 welded to the bracket 43 are opposed to left and right opposite side of the rubber joint 45, thereby defining a laterally swingable range of the rubber joint 45.

The silencers 38, 38 of the exhaust unit EU supported in the hung manner on the subframe SF protrude rearwardly from the rear cross-member 2 of the subframe SF. Therefore, even if the position of the gravity center of the subframe assembly SA is displaced forwardly due to the forward protrusion of the front portion of the fuel tank FT from the front cross-member 1 of the subframe SF, the position of the gravity center of the subframe assembly SA can be maintained at a substantially central portion of the subframe SF by an effect of retreating the position of the gravity center by the weight of the silencers 38, 38 protruding rearwardly of the vehicle from the rear cross-member 2, in addition to an effect of retreating the position of the gravity center by the fact that the rear differential RD is disposed rearwardly to lie in proximity to the rear cross-member 2.

As a result, in subassembling the subframe assembly SA in the assembling line separate from the vehicle body assembling line, the attitude of the subframe assembly SA on a pallet can be stabilized to enhance the working efficiency. Further, when the subframe assembly SA has been mounted on the vehicle body flames MF, MF of the vehicle body flowing on the vehicle body assembling line, the position of the gravity center thereof is located at the substantially central portion of the subframe SF (see FIG. 1). Therefore, it is possible to make substantially uniform the load applied to the four rubber bush mounts 9 so that they will sufficiently exhibit a vibration-proofing function, and moreover to reduce the cost of the subframe assembly by the use of the four common rubber bush mounts 9.

The position of the gravity center of the subframe assembly SA as a single device is slightly rearward of the central position of the subframe SF. However, the load finally applied to the four rubber bush mounts 9 can be made substantially correctly uniform by connecting an exhaust pipe connected to an engine to the front portion of the front exhaust pipe 34, and supporting the rear ends of the silencers 38, 38 in a hung manner on the vehicle body. Thus, the bush mounts may have a common structure as shown.

Although the preferred embodiment of the present invention has been described in detail, it will be understood that the present invention is not limited to the above-described embodiment, and various modifications in design may be made without departing from the spirit and essence of the invention. The scope of the invention is indicated by the appended claims.

What is claimed is:

1. A subframe assembly for a vehicle, comprising:

a subframe mountable at a rear portion of a vehicle body frame through a plurality of support portions, a fuel tank, left and right rear suspensions disposed on left and right opposite sides of said fuel tank, and an exhaust unit including a silencer, said fuel tank, said left and right rear suspensions and said exhaust unit being supported on said subframe; and a front portion of said fuel tank is supported to overhang forwardly from a front end of said subframe, and said silencer is disposed and supported to overhang rearwardly from a rear end of said subframe.

2. A subframe assembly for a vehicle, comprising:

a subframe mountable at a rear portion of a vehicle body frame through a plurality of support portions, a fuel tank, left and right rear suspensions disposed on left and right opposite sides of said fuel tank, and a rear differential disposed such that it is fitted into a recess defined in a lower surface of said fuel tank, said fuel tank, said left and right rear suspensions and said rear differential being supported on said subframe; and a front portion of said fuel tank is supported to overhang forwardly from a front end of said subframe, and said rear differential is supported at a location displaced rearwardly from a longitudinally central portion of said subframe.

3. A subframe assembly for a vehicle according to claim 1, further including a rear differential accommodated in a recess defined in a lower surface of said fuel tank and supported on said subframe at a location displaced rearwardly from a longitudinally central portion of said subframe.

4. A subframe assembly for a vehicle according to claim 1, wherein said fuel tank has a band hole extending therethrough in a thickness direction thereof, and a band groove extending along a surface of said fuel tank, and said fuel tank is supported on said subframe by fixing, to said subframe, a tank-fixing band passed through said band hole and fitted in said band groove.

5. A subframe assembly for a vehicle according to claim 2, wherein said fuel tank has a band hole extending therethrough in a thickness direction thereof, and a band groove extending along a surface of said fuel tank, and said fuel tank is supported on said subframe by fixing, to said subframe, a tank-fixing band passed through said band hole and fitted in said band groove.

6. A subframe assembly for a vehicle according to claim 2, wherein said subframe comprises a front cross member, a rear cross member and a pair of side members connected together in a substantially rectangular arrangement, and said rear differential is connected to said rear cross member for support.

7. A subframe assembly for a vehicle according to claim 6, wherein said rear cross member has a larger cross section and greater rigidity than those of said cross member and said side members.

8. A subframe assembly for a vehicle according to claim 3, wherein said subframe comprises a front cross member, a rear cross member and a pair of side members connected together in a substantially rectangular arrangement, and said rear differential is connected to said rear cross member for support.

9. A subframe assembly for a vehicle according to claim 8, wherein said rear cross member has a larger cross section and greater rigidity than those of said cross member and said side members.

10. A subframe assembly for a vehicle according to claim 4, wherein said fuel tank is supported on said subframe at abutments on upper surfaces of said front and rear cross members, and said tank-fixing band is connected to said front and rear cross members proximate said abutments.

11. A subframe assembly for a vehicle according to claim 5, wherein said fuel tank is supported on said subframe at abutments on upper surfaces of said front and rear cross members, and said tank-fixing band is connected to said front and rear cross members proximate said abutments.

12. A subframe assembly for a vehicle according to claim 2, wherein said recess extends longitudinally of the vehicle, and said rear differential is disposed in a rear part of said recess.

13. A subframe assembly for a vehicle according to claim 3, wherein said recess extends longitudinally of the vehicle, and said rear differential is disposed in a rear part of said recess.

14. A subframe assembly for a vehicle according to claim 13, wherein said exhaust unit further includes a front exhaust pipe, said front exhaust pipe being accommodated within said longitudinally extending recess.

15. A subframe assembly for a vehicle according to claim 2, wherein a portion of said fuel tank above said recess has a reduced vertical thickness, and welds joining upper and lower sections of said fuel tank are disposed in said reduced thickness portion.

16. A subframe assembly for a vehicle according to claim 1, wherein a gravity center of said subframe assembly is at a substantially central portion of said subframe.

17. A subframe assembly for a vehicle according to claim 2, wherein a gravity center of said subframe assembly is at a substantially central portion of said subframe.

* * * * *